United States Patent
Kumar et al.

(10) Patent No.: US 11,416,925 B2
(45) Date of Patent: Aug. 16, 2022

(54) ADAPTIVE SYSTEM FOR DETECTING ABUSIVE ACCOUNTS

(71) Applicant: PayPal, Inc., San Jose, CA (US)

(72) Inventors: Dinesh Kumar, Santa Clara, CA (US); Yaqin Yang, Santa Clara, CA (US); Fransisco Kurniadi, Dublin, CA (US)

(73) Assignee: PayPal, Inc., San Jose, CA (US)

( * ) Notice: Subject to any disclaimer, the term of this patent is extended or adjusted under 35 U.S.C. 154(b) by 16 days.

(21) Appl. No.: 16/730,644

(22) Filed: Dec. 30, 2019

(65) Prior Publication Data
US 2021/0201395 A1     Jul. 1, 2021

(51) Int. Cl.
*G06Q 40/02*     (2012.01)
*G06Q 30/06*     (2012.01)

(52) U.S. Cl.
CPC ......... *G06Q 40/02* (2013.01); *G06Q 30/0607* (2013.01); *G06Q 30/0609* (2013.01)

(58) Field of Classification Search
CPC .................................................. G06Q 40/02
USPC ........................................................ 705/35
See application file for complete search history.

(56) References Cited

U.S. PATENT DOCUMENTS

| | | | |
|---|---|---|---|
| 2011/0087606 A1* | 4/2011 | Hammond | G06Q 20/407 705/304 |
| 2018/0350006 A1* | 12/2018 | Agrawal | G06F 7/026 |
| 2019/0102536 A1* | 4/2019 | Chopra | G06F 21/45 |
| 2019/0141068 A1* | 5/2019 | Park | H04L 63/102 |
| 2020/0013124 A1* | 1/2020 | Obee | G06Q 40/08 |

OTHER PUBLICATIONS

The non-patent literature IEEE ; Relating Reputation and Money in On-Line Markets dated 2009 Author: Ashwin Swaminathan et al. (Year: 2009).*

* cited by examiner

*Primary Examiner* — Bruce I Ebersman
*Assistant Examiner* — John A Anderson
(74) *Attorney, Agent, or Firm* — Haynes and Boone, LLP

(57) ABSTRACT

A system performs operations that include identifying a first subset of accounts from a set of accounts, each account in the first subset of accounts satisfying a first abuse score threshold for a first time period, the first abuse score threshold corresponding to a first buyer abuse component. The operations further include determining a first restriction rate for the first subset of accounts based on a number of accounts in the first subset of accounts that have been restricted for potential abuse. The operations also include comparing the first restriction rate with respective restriction rates of one or more other subsets of the set of accounts that correspond to one or more other abuse components, and based on the comparing, determining whether to adjust the first abuse score threshold.

20 Claims, 6 Drawing Sheets

ADAPTIVE SYSTEM FOR DETECTING ABUSIVE ACCOUNTS

BACKGROUND

Technical Field

This disclosure relates generally to fraud detection and, more specifically, to an adaptive system for detecting abusive accounts.

Description of the Related Art

In ecommerce, companies invest heavily in the detection of fraudulent transactions and other abusive behaviors to reduce loss associated with these behaviors. One particular abusive buyer behavior is when a buyer purchases an item from a seller, receives the item, and then files a claim (e.g., with the merchant, a service provider facilitating the financial aspect of the transaction, and/or other any other entity) for a refund indicating a problem with item. For example, the claim may indicate that the buyer never received the item, the item was not as described, and/or the item was defective. In the end, the buyer retains the item and is refunded the purchase.

In order to detect such abusive buyer behavior, a service provider may have various machine learning models that compute a risk score associated with different buyer accounts based on past transactions of those accounts. Case review agents may review flagged accounts whose respective risk scores satisfy a score threshold. The case review agents may then decide which of the flagged accounts are to be restricted in some manner. However, the bandwidth for the agents' review is limited.

Figure 1:
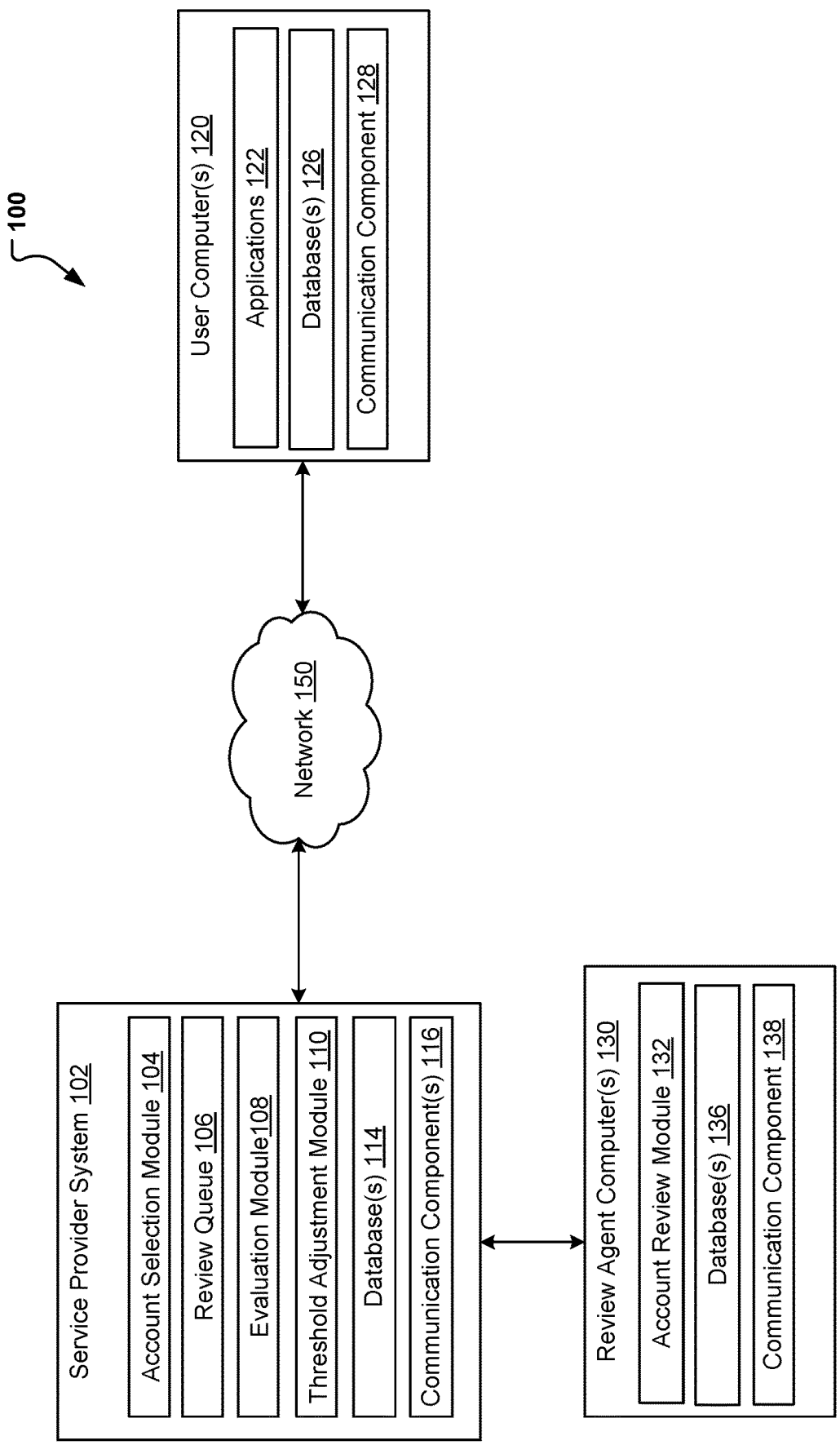
FIG. 1 is a block diagram illustrating an example system for an adaptive system for detecting abusive accounts, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "account selection module" "configured to select and/or identify one or more accounts" is intended to cover, for example, a device that performs this function during operation, even if the corresponding device is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "processing element" refers to various elements configured to execute program instructions (or portions thereof or combinations thereof). Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

DETAILED DESCRIPTION

Techniques are disclosed for implementing an adaptive system for detecting abusive accounts. A service provider system maintained by a service provider is configured to identify one or more accounts associated with potentially abusive buyer behavior. Abusive buyer behavior may generally include buyers who purchase items and then fraudulently file a claim for a refund of the purchase price while keeping the purchased item. For example, a buyer may purchase the item, receive the item, and subsequently claim that the item was never delivered or received. As another example, the buyer may subsequently claim that the item is defective or that that item is not as described According to a particular embodiment, the service provider system is configured to determine a risk score for each account of a set of accounts with a service provider. The risk score indicates a likelihood that an account is associated with an abusive buyer (e.g., a buyer that exhibits abusive buyer behavior). As such, the service provider system may be configured to execute a machine learning abuse model w/respect to past claims that were filed by the set of accounts for various transactions. Based on various claim and/or transaction information for each account, the machine learning model calculates respective risk scores for the accounts.

For example, a set of accounts may be analyzed by the machine learning abuse model for a given time period. The respective risk score calculated by the machine learning abuse model for each account in the set of accounts is evaluated against a risk score threshold. Accounts having risk scores that satisfy the risk score threshold (e.g., accounts that are deemed "risky" by the machine learning abuse model) are stored in a review queue for a review agent to review. Accounts that do not satisfy the risk score threshold (e.g., accounts that are not deemed risky by the machine learning abuse model) are subsequently evaluated by one or more abuse component modules.

Each abuse component module corresponds to a particular type and/or category of buyer abuse. For example, categories of buyer abuse may include, but are not limited to, high volume case filers, high volume case filers with disputed merchants, risky email domains, and prolific complainers. Each abuse component module further determines a respective abuse score for accounts that are evaluated. Further, each abuse component module is associated with a respective abuse score threshold against which the respective abuse scores are compared. As such, for an abuse component module evaluating a particular account, if the respective abuse score for the abuse component module satisfies its respective abuse score threshold, the particular account is labeled/categorized as belonging to the corresponding category of buyer abuse. Further, the particular account is stored in the review queue.

Thus, various accounts may be stored in the review queue as a result of being evaluated by the machine learning abuse model or by one or more of the abuse component models. Each account in the queue may be reviewed to determine whether the one or more restrictions are to be placed on the account. Restrictions may include, but are not limited to, restricted and/or limited access to the account, restricted number of transactions that can be conducted by the account for a given period of time, monetary restrictions on transactions, and/or the like. According to certain embodiments, each of the transactions is reviewed by a review agent, who may indicate whether any restrictions are placed on the account.

After the account are reviewed, the service provider system may calculate restriction rates associated with the machine learning abuse model and the abuse component modules. For instance, the machine learning abuse model and the abuse component modules may each be associated with a respective set of accounts. The set of accounts associated with machine learning abuse model are the accounts that satisfied the risk score threshold for the machine learning abuse model. A set of accounts associated with an abuse component module include accounts that were labeled as belonging to the corresponding abuse category. As such, the restriction rate for a particular set of accounts may be the ratio between the number of accounts in the particular set of accounts that were restricted (e.g., by a review agent) and the total number of accounts included in the particular set of accounts.

The service provider system is configured to compare the respective restriction rates of the machine learning abuse model and the abuse component modules to calculate a restriction rate threshold. In some embodiments, the restriction rate threshold may be an average of the respective restriction rates. Further, the service provider system compares the respective restriction rates with the restriction rate threshold. Based on the comparison, the service provider system determines whether to adjust the score thresholds (e.g., the risk score threshold and/or the abuse score thresholds).

For example, the service provider sever may compare a first restriction rate of a first abuse component module with the restriction rate threshold. If a difference between the first restriction rate and the restriction rate threshold is greater than a predetermined amount, the service provider system determines that the abuse score threshold for the first abuse component module is to be adjusted. To this end, if the first restriction rate is less than the restriction rate threshold, the service provider system adjusts the abuse score threshold such that future accounts that are evaluated by the first abuse component module are less likely to satisfy the abuse score threshold, and therefore less likely to be categorized in the buyer abuse category corresponding to the first abuse component module. On the other hand, if the first restriction rate is more than the restriction rate threshold, the service provider system adjusts the abuse score threshold such that future accounts that are evaluated by the first abuse component module are more likely to satisfy the abuse score threshold, and therefore more likely to be categorized in the buyer abuse category corresponding to the first abuse component module.

Thus, the service provider system is configured to adjust risk score threshold and/or abuse score thresholds to maximize an overall restriction rate corresponding to the entire set of accounts corresponding to the machine learning abuse model and the abuse component modules. This reduces the number of accounts that are reviewed that do not result in restrictions, which improves the predictive ability of the machine learning abuse model and the abuse component modules.

FIG. 1 is a block diagram illustrating an example system 100 for an adaptive system for detecting abusive accounts. In the illustrated embodiment, the system 100 includes a service provider system 102, maintained by a service provider, in communication with other computer(s) 120 via a network 150. It will be appreciated that the service provider system 102 may include one or more computers, servers, and/or other devices, and that the modules included in the service provider system 102 may be executed by any combination of those devices.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

In FIG. 1, service provider system 102 may include an account selection module 104, a review queue 106, an evaluation module 108, a threshold adjustment module 110, database(s) 114, and communication components 116. Each of the components of the service provider system 102 may communicate with each other to implement the adaptive system for detecting abusive accounts, as will be described in more detail below.

The account selection module 104 is configured to select and/or identify one or more accounts associated with potential abusive buyer behavior. For example, the service provider system may receive transaction information and/or claim information from user computer(s) 120 attempting to obtain a refund for a purchased item. The account selection module 104 may determine potentially abusive accounts based on the transaction information and/or claim information. As previously discussed, abusive buyers may include buyers who purchase items and then fraudulently file a claim for a refund of the purchase price while keeping the purchased item. The account selection module 104 may group accounts according to different abuse categories, as will be described in more detail with respect to FIG. 2 and FIG. 3. The account selection module 104 stores and/or otherwise provides the identified accounts to the review queue 106.

The review queue 106 may be stored in a storage of the service provider system 102. One or more review agent computer(s) 130 may access the review queue 106 to review the accounts stored therein. The accounts may be reviewed via an account review module 132 in communication with the service provider system 102. A determination on whether accounts should be restricted is made. Subsequently, the account review module 132 provides the accounts to the evaluation module 108.

The evaluation module 108 is configured to determine restriction rates associated with various buyer abuse categories. Further, the evaluation module 108 determines a restriction rate threshold based on a comparison of the restriction rates. The respective restriction rates and the restriction rate threshold are provided to the threshold adjustment module 110.

The threshold adjustment module 110 is configured to determine whether to adjust various score thresholds associated with the buyer abuse categories. The determinations may be made based on comparisons between the respective restriction rates and the restriction rate threshold. Generally, for buyer abuse categories associated with relatively low restriction rates, the threshold adjustment module 110 adjusts the corresponding score thresholds such that future accounts that are evaluated by the account selection module 104 are less likely to be included in those buyer abuse categories. Conversely, for buyer abuse categories associated with relatively high restriction rates, the threshold adjustment module 110 adjusts the corresponding score thresholds such that future accounts that are evaluated by the account selection module 104 are more likely to be included in those buyer abuse categories.

The database(s) 114 stores various information that may include, for example, identifiers (IDs) such as operating system registry entries, cookies, IDs associated with hardware of the communication component 116, IDs used for payment/user/device authentication or identification, and/or other appropriate IDs. Further, the database 114 may store login credentials (e.g., such as to login to an account with the service provider and/or other accounts with other service providers), identification information, biometric information, and/or authentication information of the user the applications 122 connect to the service provider system 102 to access. The database 114 may also store the review queue 106 in some embodiments.

The communication component 116 may be configured to communicate with various other devices, such as the user computer(s) 120 and/or other devices. In various embodiments, communication component 14 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

FIG. 1 further illustrates the user computer(s) 120, each of which includes applications 122, database 126, and communication component 128. As previously discussed, the applications 122 may be any type of application that access the service provider system 102. According to a particular embodiment, the applications are user applications for a payment service provider that communicates with the service provider system 102 to facilitate payment transactions and other financial transactions.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 2:
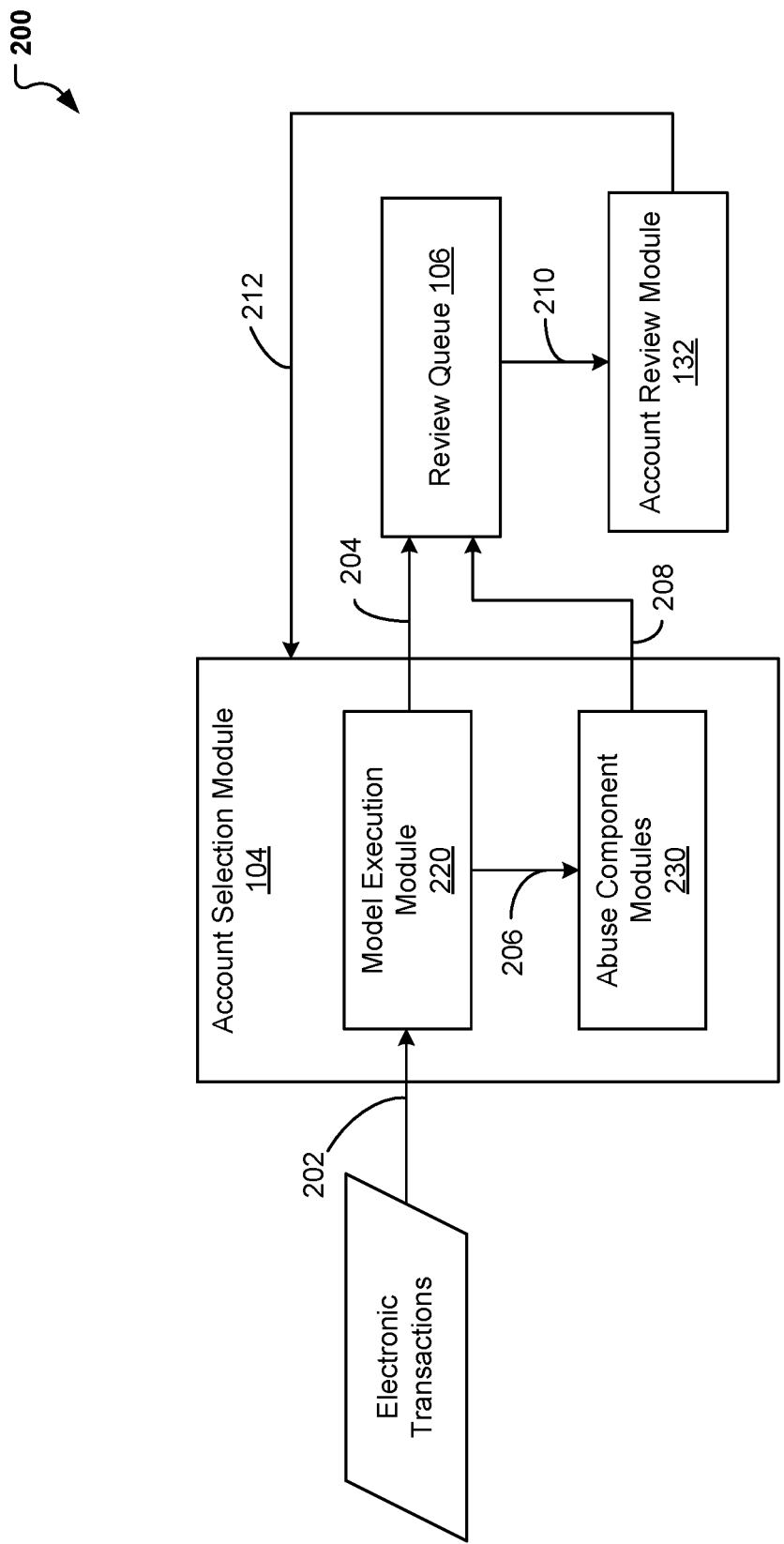
FIG. 2 is a diagram illustrating a data flow selecting potentially abusive accounts for review, according to some embodiments.

FIG. 2 illustrates a data flow diagram 200 for selecting potentially abusive accounts in accordance with a particular embodiment. Portions of FIG. 2 are described in conjunction with FIG. 4. As shown in FIG. 2, one or more electronic transactions 202 may be provided to the account selection module 104 at step 202. For example, each transaction may be a refund claim that is associated with an account identifier that indicates the account that filed the refund claim.

The account selection module 104 may include a model execution module 220 and one or more abuse component modules 230. The model execution module 220 may be configured to execute an abuse model. The abuse model may be a machine learning model that receives account information associated with various the user accounts with the service provider. The account information may include information based on the electronic transactions 202, such as a number of refund claims filed by the account in a given time period, an email address and/or other identification information associated with the account, merchants that the account has transacted with, and/or the like.

Based on the account information, the abuse model may calculate respective abuse scores for the accounts. The model execution module 220 may compare the respective abuse scores with an abuse score threshold. At step 204, the model execution module 220 provides accounts that have an abuse score that satisfies the abuse score threshold (e.g., accounts for users that are deemed to be potentially abusive buyers) to the review queue 106. For example, the abuse model may output scores ranging from 0 to 100, where the higher the score, the more likely an account is abusive. The abuse score threshold may be a score of 75. As such, accounts (e.g., their respective account identifiers and/or other relevant information) having an abuse score of 75 or higher may be provided to the review queue 106.

At step 206, the model execution module 220 provides accounts having abuse scores that do not satisfy the abuse score threshold to the abuse component modules 230. Each of the abuse component modules may correspond to a respective abuse category. Further, each abuse component module 230 evaluates the accounts provided by the model execution module 220 to determine whether the accounts should be included in its respective abuse category. As such, each abuse component module 230 may determine a respective abuse component score for an account that it evaluates. The criteria for scoring the account may be different for each abuse component module 230. Further, each abuse component module is associated with a respective component score threshold. For each account evaluated by an abuse component module 230, the abuse component module 230 compares the account's abuse component score (e.g., for that abuse component module 230) with the component score threshold corresponding to the abuse component module 230. If its abuse component score satisfies the component score threshold, the account is provided to the review queue 106 at step 208.

Thus, the review queue 106 stores accounts that have been determined to be potentially abusive by the abuse model (e.g., via the model execution module 220) and/or by one or more of the abuse component modules 230. As such, each of the accounts stored in the review queue 106 may be associated with information (e.g., metadata) that indicates its abuse category. For example, accounts that were placed in the review queue 106 by the model execution module 220 may be associated with information that indicates a general abuse category. Accounts that were placed in the review queue 106 by an abuse component module 230 may be associated with information that indicates the particular abuse category corresponding to the abuse component module 230.

At step 210, the accounts stored in the review queue 106 are reviewed by review agents via the account review module 132 of the review agent computer(s) 130. A determination is made for each account as to whether one or more restrictions are to be placed on the account. Such restrictions may include, but are not limited to, restricted and/or limited access to the account, restricted number of transactions that can be conducted by the account for a given period of time, monetary restrictions on transactions, and/or the like.

At step 212, the results of the account review module are eventually fed back to the account selection module 104. As will be described in FIG. 3, one or more score threshold associated with the abuse model and/or the abuse component modules 230 may be adjusted as part of the feedback of step 212.

Figure 3:
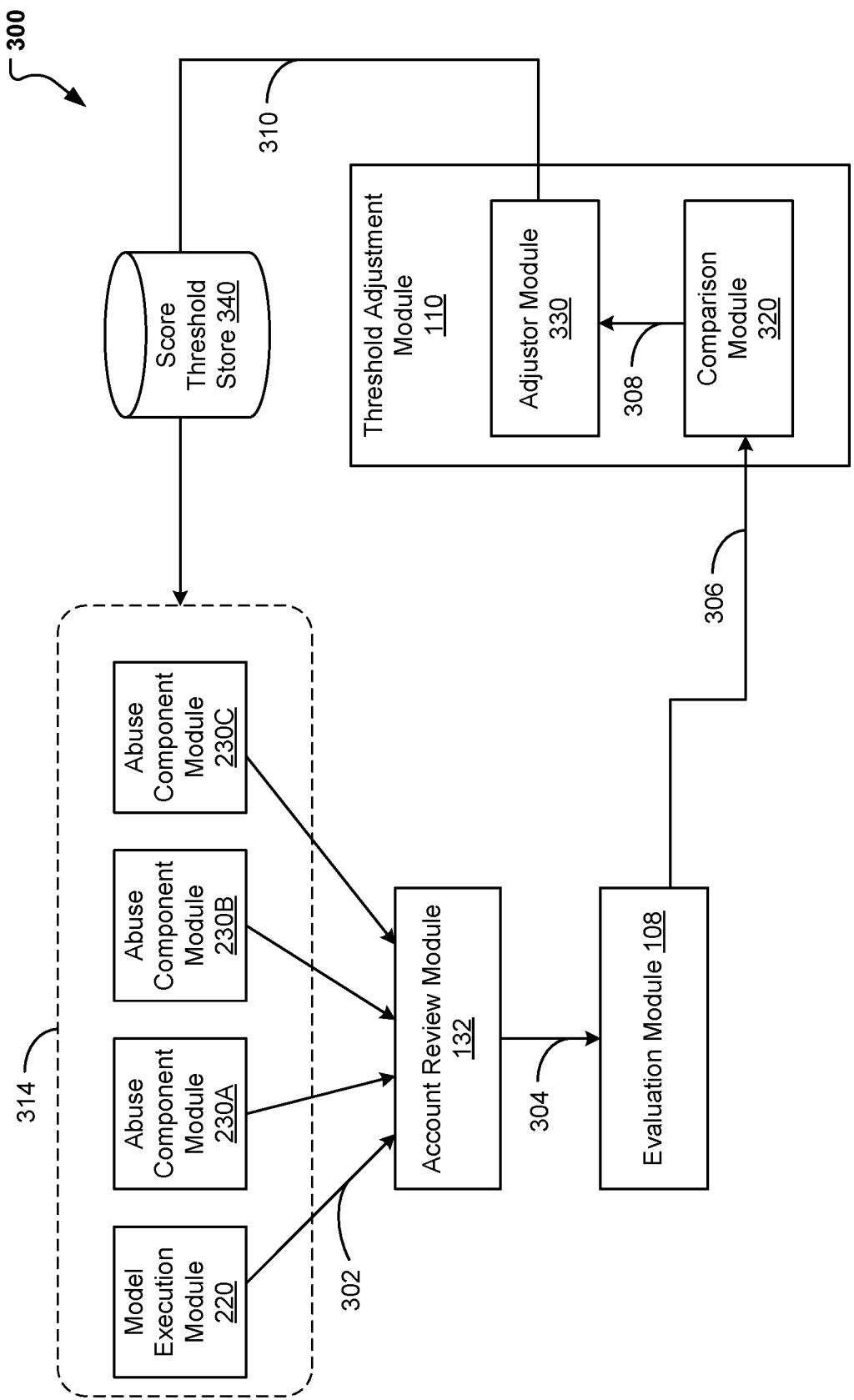
FIG. 3 is a diagram illustrating a data flow for an adaptive system for detecting abusive accounts, according to some embodiments.

Referring now to FIG. 3, another data flow diagram 300 is illustrated for adjusting abuse score thresholds in accordance with one or more embodiments. As shown in FIG. 3, the execution module 220 and abuse component modules 230A-C may provide accounts to the review queue 106 to be reviewed by the account review module 132. The model execution modules 220 (e.g., or the abuse model that is executed) may be associated with a abuse score threshold. Similarly, abuse component module 230A may be associated with a first component score threshold, abuse component module 230B may be associated with a second component score threshold, and abuse component module 230C may be associated with a third component score threshold.

It will be appreciated that while a certain combination of modules is depicted in FIG. 3, any number of module execution modules and abuse component modules are possible in any combination. Further, according to the examples described herein, a greater abuse score and/or abuse component score for an account indicates a greater likelihood of the account being an abusive account, and a lower abuse score and/or abuse component score for an account indicates a lesser likelihood of the account being an abusive account. However, it will be appreciated that other scoring scales and frameworks are also possible and contemplated within the present disclosure.

As previously discussed, the account review module 132 may determine which accounts are to have restrictions placed on them. According to a particular embodiment, the account review module 132 is configured to label and/or otherwise indicate for each account whether the account has had a restriction placed on it. For example, the indication may be included in metadata that the account review module 132 associates with the account. The accounts (e.g., and/or the metadata that indicates the corresponding abuse categories and whether restrictions have been imposed) are then stored in a storage, such as a database 114, to be accessed at a later point in time.

At step 304, the evaluation module 108 accesses the stored accounts (or its metadata). The evaluation module 108 may be configured to periodically access the storage to identify accounts that have been stored within a predetermined time period (e.g., the previous two weeks). These identified accounts are hereinafter referred to as the "overall set of accounts". The evaluation module 108 is configured to determine respective restriction rates for each of the model execution model 220 and abuse component modules 230A-C. According to a particular embodiment, the evaluation module 108 determines a restriction rate for the model execution module 220 by identifying a subset of account from the overall set of accounts that indicate the general abuse category. The evaluation module 108 also determines a total number of accounts in the subset and a number of accounts in the subset that had a restriction imposed. As such, the evaluation module 108 calculates the restriction rate as the ratio of the number of accounts that had a restriction imposed to the total number of accounts in the subset.

Similarly, in order to calculate the restriction rate for an abuse component module 230A-C, the evaluation module 108 identifies a subset of account from the overall set of accounts that indicate the respective abuse category corresponding to the component module 230A-C. The evaluation module 108 calculates the restriction rate for the component module 230A-C as the ratio of a number of accounts in the subset that had a restriction imposed to the total number of accounts in the subset for the respective abuse category.

In some implementations, the evaluation module 108 also calculates a total restriction rate for the model execution module 220 and the abuse component modules 230A-C as a group. The total restriction rate may be determined as the ratio of a number of accounts in the overall set of accounts that had a restriction imposed to a total number of accounts included in the overall set of accounts. Thus, it should be noted that the operations of the components described in FIG. 3 are performed in order to maximize the total restriction rate corresponding to the group of the model execution module 220 and the abuse component modules 230A-C. This is generally accomplished by adjusting the respective abuse score threshold and/or component score thresholds such that for a module (e.g., modules 220 and 230A-C)

having a relatively low restriction rate, it will be less likely for accounts to be categorized according to its respective abuse category in the future. Additionally, for a module (e.g., modules 220 and 230A-C) having a relatively high restriction rate, it will be more likely for accounts to be categorized according to its respective abuse category in the future.

Based on the respective restriction rates of the model execution module 220 and the abuse component modules 230A-C, the evaluation module 108 determines a restriction rate threshold. According to certain embodiments, the restriction rate threshold may correspond to an average of the respective restriction rates. The evaluation module 108 provides the respective restriction rates and the restriction rate threshold to the threshold adjustment module at step 306.

A comparison module 320 included in the threshold adjustment module 110 may be configured to compare the respective restriction rates with the restriction rate threshold. For example, the comparison module 320 may determine, for each of the model execution module 220 and abuse component modules 230A-C, whether the difference between its respective restriction rate and the restriction rate threshold (whether the difference is positive or negative) is greater than a predetermined amount. In some embodiments, the predetermined amount may be a percentage (e.g., 5%) of the restriction rate threshold.

At step 308, the comparison module 320 provides any restriction rate, whose difference from the restriction rate threshold is greater than the predetermined amount, to the adjustor module 330. For each of the restriction rates provided to the adjustor module 110, the adjust module 110 may determine whether the restriction rate is greater than or less than the restriction rate threshold. If the restriction rate is greater than the restriction rate threshold, the adjustor module 330 may decrease the score threshold of the corresponding module by a first predetermined value. If the restriction rate is less than the restriction rate threshold, the adjustor module 330 may increase the score threshold of the corresponding module by a second predetermined value.

The first predetermined value and the second predetermined value may be the same or different. As an example, the first and second predetermined values are respective percentages of the restriction rate being evaluated by the adjustor module 330. As another example, the first and second predetermined values may be determined based on the amount of difference between the respective restriction rate and the restriction rate threshold. For instance, a greater difference may result in a greater first predetermined value and/or second predetermined value. It will be appreciated that the first and second predetermined values may be various other values as well.

At step 310, any adjusted score thresholds (e.g., abuse score threshold and/or component score thresholds) are stored in a score threshold store 340. The scores threshold store 340 may be any type of storage medium and in some embodiments, may be the database 114 of the service provider system 102. The score threshold store 340 may store associations between score thresholds and corresponding modules (e.g., modules 220 and 230A-C). As a result, the modules 220 and 230A-C subsequently evaluates accounts according to their respective score thresholds that are stored in the score threshold store 340, which may have been adjusted depending on their respective restriction rates.

Thus, the respective score thresholds of model execution module 220 and the abuse component modules 230A-C can be periodically and continuously adjusted so as to maximize their total restriction rate. Maximizing the total restriction rate increases the predictive ability of the service provider system 102 to identify actual abusive accounts that result in restrictions being imposed. In other words, the number of accounts that are reviewed (e.g., that are placed in the review queue 106) that do not result in any restrictions being imposed are reduced, thereby increasing the efficiency of the service provider system 102 in identifying abusive accounts.

For instance, consider an implementation in which the score thresholds range from 0-1000 in which a greater score indicates a greater likelihood of an account being an abusive account. Additionally, the model execution module 220 is associated with an abuse score threshold of 600, the first component score threshold of abuse component module 230A is 700, the second component score threshold of abuse component module 230B is 850, and the third component score threshold of abuse component module 230C is 450. Further, the model execution module 220 has a restriction rate of 50%, component module 230A has a restriction rate of 60%, component module 230B has a restriction rate of 70%, and abuse component module 230C has a restriction rate of 80%.

The evaluation module 108 may calculate the restriction rate threshold to be 65%. In this example, the comparison module 320 identifies restriction rates that have a greater than 5% difference from the restriction rate threshold. Thus, the comparison module 320 identifies the restriction rate for the model execution module 220 (50%) and the restriction rate for abuse component module 230C (80%). Since the restriction rate of the model execution module 220 is less than the restriction rate threshold, the adjustor module 330 decreases the abuse score threshold by a first predetermined value (e.g., 5%). Thus, abuse score threshold is adjusted to be 570. Additionally, since the restriction rate for abuse component module 230C is greater than the restriction rate threshold, the adjustor module 330 increases the third component score threshold by a second predetermined value (e.g., 5%). As a result, the third component score threshold is adjusted to be 472.5.

Figure 4:
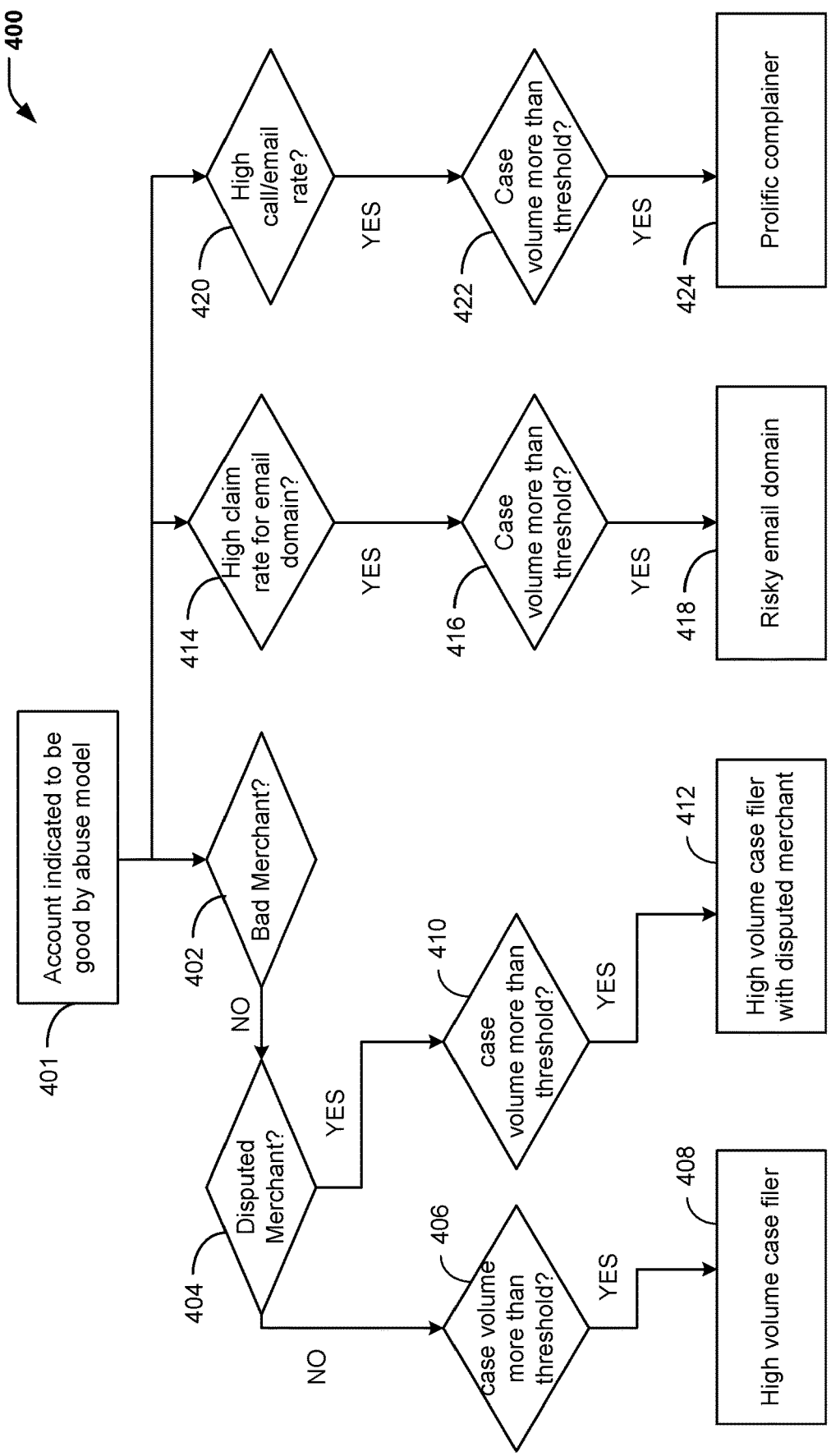
FIG. 4 illustrate a flow diagram that depicts a method for categorizing accounts into different fraud components, according to some embodiments.

FIG. 4 illustrates a flow diagram of a method 400 for categorizing accounts into example abuse categories, in accordance with one or more particular embodiments. The method 400 may be performed by the account selection module 104 of service provider system 102. The account selection module 104 may evaluate each account according to the method 400. The method 400 beings at step 401, wherein an account is indicated to be "good" by an abuse model (e.g., such as an abuse model executed by model execution module 220). A "good" account may be an account having an abuse score that does not satisfy the abuse score threshold associated with the abuse model.

At step 402, a determination may be made as to whether the refund claims filed by the account have been with a bad merchant. A bad merchant may be a merchant known to exhibit certain criteria (e.g., fraudulent, misleading item description, failed to provide purchased items, etc.). If not, the method 400 proceeds to step 404 in which a determination is made as to whether the refund claims filed by the account have been made with a disputed merchant. A disputed merchant may be a merchant against which a claim has previously been filed by the account. If the merchant is not a disputed merchant, then at step 406, the account selection module determines whether a volume of cases filed by the account is greater than a first threshold. If so, the account is categorized as a high volume case filer at step 408. In some embodiments, the volume of cases filed by the account may contribute to an abuse component score associated with the high volume case filer abuse category, and the first threshold may be a component score threshold associated with the high volume case filer abuse category.

If, at step 404, the determination is made in the affirmative, the method 400 proceeds to step 410 in which a determination is made as to whether a volume of cases filed by the account with the disputed merchant is greater than a second threshold. If so, the account is categorized as a high volume case filer with a disputed merchant at step 412. In some embodiments, the volume of cases filed by the account with the disputed merchant may contribute to another abuse component score associated with this abuse category, and the second threshold may be a component score threshold associated with this abuse category.

At step 414, the account selection module determines whether an email domain associated with the account is associated with a high rate of refund claims being filed. If so, at step 415, the account selection module determines whether a volume of cases filed by the account is greater than a third threshold at step 416. If so, at step 418, the account is categorized as having a risky email domain. In some embodiments, the volume of cases filed by the account associated with the email domain may contribute to another abuse component score associated with the risky email domain abuse category, and the third threshold may be a component score threshold associated with the risky email domain abuse category.

At step 420, the account selection module may determine whether the account is associated with a high call or email rate (e.g., to customer service provided by the service provider). If so, at step 422, the account selection module determines whether a volume of cases filed by the account is greater than a fourth threshold. If so, at step 424, the account is categorized as a prolific complainer. In some embodiments, the volume of cases filed by the account may contribute to another abuse component score associated with the prolific complainer abuse category, and the fourth threshold may be a component score threshold associated with the prolific complainer abuse category.

It will be appreciated that the present disclosure is not limited to the abuse categories depicted in FIG. 4. Any other abuse categories having various other criteria are also possible.

Figure 5:
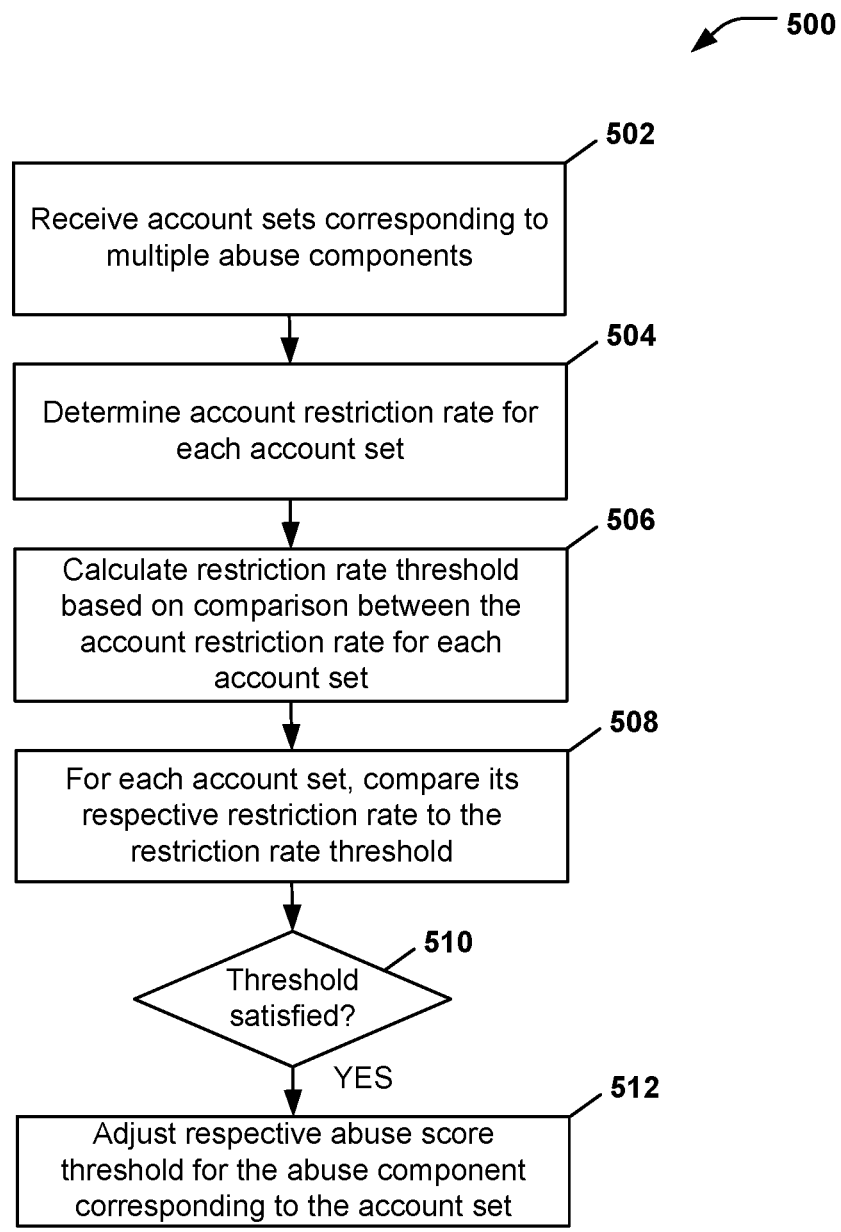
FIG. 5 illustrates a flow diagram that depicts a method for detecting abusive accounts, according to some embodiments.

FIG. 5 illustrates an example flow diagram of a method 500 for an adaptive system for detecting abusive accounts, in accordance with one or more particular embodiments. The method 500 begins at step 502, where a service provider system (e.g., service provider system 102) receives multiple account sets corresponding to multiple abuse components (e.g., and/or abuse categories).

At step 504, the service provider system determines a respective account restriction rate for each account set. At step 506, the service provider system calculates a restriction rate threshold based on comparisons between each of the respective restriction rates. At step 508, the service provider system compares, for each account set, its respective restriction rate to the restriction rate threshold. At step 510, the service provider system determines whether the respective restriction rate satisfies the restriction rate threshold. If so, at step 512, the service provider system adjusts a respective abuse score threshold for the abuse component corresponding to the account set that is associated with the respective restriction rate.

Example Computing Device

Figure 6:
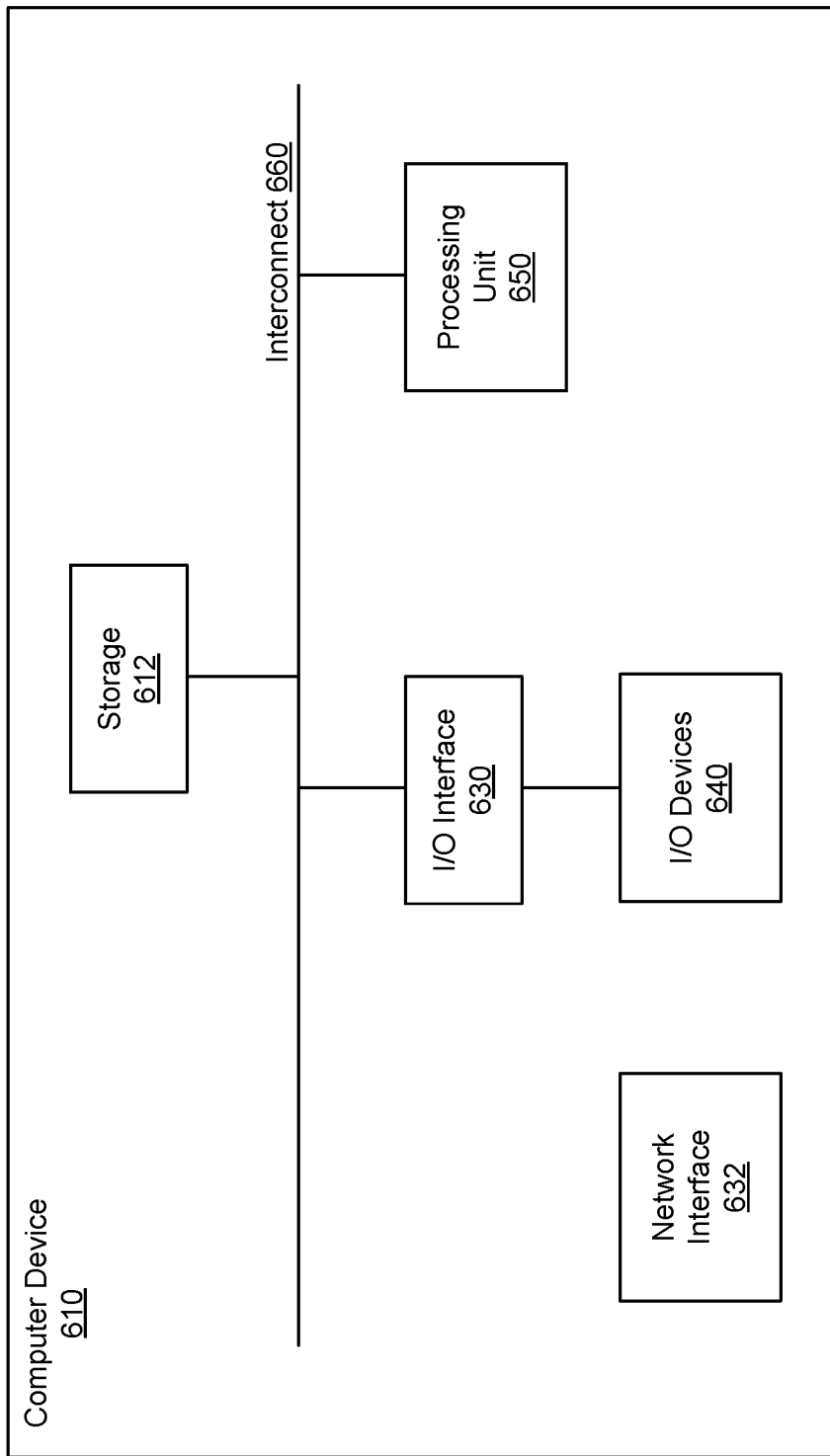
FIG. 6 is a block diagram illustrating an exemplary computing device, according to some embodiments.

Turning now to FIG. 6, a block diagram of one embodiment of computing device (which may also be referred to as a computing system) 610 is depicted. Computing device 610 may be used to implement various portions of this disclosure including any of the components illustrated in FIG. 1 and FIG. 2A-C. Computing device 610 may be any suitable type of device, including, but not limited to, a personal computer system, desktop computer, laptop or notebook computer, mainframe computer system, web server, workstation, or network computer. As shown, computing device 610 includes processing unit 650, storage 612, and input/output (I/O) interface 630 coupled via an interconnect 660 (e.g., a system bus). I/O interface 630 may be coupled to one or more I/O devices 640. Computing device 610 further includes network interface 632, which may be coupled to network 620 for communications with, for example, other computing devices.

In various embodiments, processing unit 650 includes one or more processors. In some embodiments, processing unit 650 includes one or more coprocessor units. In some embodiments, multiple instances of processing unit 650 may be coupled to interconnect 660. Processing unit 650 (or each processor within 650) may contain a cache or other form of on-board memory. In some embodiments, processing unit 650 may be implemented as a general-purpose processing unit, and in other embodiments it may be implemented as a special purpose processing unit (e.g., an ASIC). In general, computing device 610 is not limited to any particular type of processing unit or processor subsystem.

Storage subsystem 612 is usable by processing unit 650 (e.g., to store instructions executable by and data used by processing unit 650). Storage subsystem 612 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 612 may consist solely of volatile memory, in one embodiment. Storage subsystem 612 may store program instructions executable by computing device 610 using processing unit 650, including program instructions executable to cause computing device 610 to implement the various techniques disclosed herein.

I/O interface 630 may represent one or more interfaces and may be any of various types of interfaces configured to couple to and communicate with other devices, according to various embodiments. In one embodiment, I/O interface 630 is a bridge chip from a front-side to one or more back-side buses. I/O interface 630 may be coupled to one or more I/O devices 640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A system, comprising:
one or more hardware processors; and
a non-transitory memory storing computer-executable instructions, that in response to execution by the one or more hardware processors, causes the system to perform operations comprising:
processing a plurality of accounts using an abuse model, wherein the processing generates, for each account in the plurality of accounts, a risk score using the abuse model based on attributes of the account;
determining, from the plurality of accounts, that a first subset of accounts corresponds to a first risk category based on the first subset of accounts having first risk scores that satisfy a risk threshold corresponding to the abuse model;
determining, from the plurality of accounts, that a second subset of accounts corresponds to a second risk category based on the second subset of accounts having second risk scores that do not satisfy the risk threshold corresponding to the abuse model;
processing each account in the second subset of accounts using each one of a plurality of abuse components, wherein each abuse component in the plurality of abuse components is configured to predict whether an account has been used to conduct a corresponding type of abuse transactions based on a corresponding abuse score threshold;
determining, for each abuse component in the plurality of abuse components and from the second subset of accounts, a corresponding account set predicted to have been used to conduct the corresponding type of abuse transactions based on the corresponding abuse score threshold, each account in the corresponding account set satisfying the corresponding abuse score threshold associated with the corresponding abuse component;
determining a first restriction rate representing a first ratio between a number of accounts from the first subset of accounts that are labeled as abusive and a first total number of accounts in the first subset of accounts;
determining a plurality of account restriction rates for the plurality of abuse components, wherein each account restriction rate in the plurality of account restriction rates determined for an abuse component represents a corresponding ratio between a number of accounts from the corresponding account set corresponding to the abuse component that are labeled as abusive and a corresponding total number of accounts in the corresponding account set corresponding to the abuse component;
calculating a restriction rate threshold based on the first restriction rate and the plurality of account restriction rates;
determining that a difference between the restriction rate threshold and a first account restriction rate determined for a first abuse component of the plurality of abuse components is greater than a threshold amount;
determining whether the first account restriction rate is less than the restriction rate threshold; and
adjusting a first abuse score threshold for the first abuse component based on the difference.

2. The system of claim 1, wherein a first account set corresponds to the first abuse component of the plurality of abuse components, and wherein each remaining account set of the plurality of account sets fails to satisfy the first abuse score threshold.

3. The system of claim 1, wherein the restriction rate threshold is an average restriction rate based on the first restriction rate and the plurality of account restriction rates.

4. The system of claim 1, wherein the operations further comprises:
determining a second difference between the restriction rate threshold and a second account restriction rate determined for a second abuse component of the plurality of abuse components; and
determining not to adjust a second abuse score threshold for the second abuse component when the second difference is less than the threshold amount.

5. The system of claim 1, wherein the operations further comprise:
determining that the first account restriction rate for the first abuse component is less than the restriction rate threshold.

6. The system of claim 5, wherein the adjusting the first abuse score threshold comprises:
responsive to determining that the first account restriction rate is less than the restriction rate threshold, increasing the first abuse score threshold associated with the first abuse component.

7. The system of claim 1, wherein the operations further comprise:
determining that the first account restriction rate for the first abuse component is greater than the restriction rate threshold, wherein the adjusting the first abuse score threshold comprises responsive to determining that the first account restriction rate is greater than the restriction rate threshold, decreasing the first abuse score threshold associated with the first abuse component.

8. The system of claim 1, wherein the operations further comprise:
normalizing the first abuse score threshold subsequent to the adjusting.

9. The system of claim 1, wherein each account in a first account set corresponding to the first abuse component is associated with a respective abuse score that satisfies the first abuse score threshold associated with the first abuse component.

10. A method, comprising:
processing, by one or more hardware processors, a plurality of accounts using an abuse model, wherein the processing generates, for each account in the plurality of accounts, a risk score using the abuse model based on attributes of the account;

determining, by the one or more hardware processors from the plurality of accounts, that a first subset of accounts corresponds to a first risk category based on the first subset of accounts having first risk scores that satisfy a risk threshold corresponding to the abuse model;

determining, by the one or more hardware processors from the plurality of accounts, that a second subset of accounts corresponds to a second risk category based on the second subset of accounts having second risk scores that do not satisfy the risk threshold corresponding to the abuse model;

processing, by the one or more hardware processors, each account in the second subset of accounts using each one of a plurality of abuse components, wherein each abuse component in the plurality of abuse components is configured to predict whether an account has been used to conduct a corresponding type of abuse transactions based on a corresponding abuse score threshold;

determining, by the one or more hardware processors for each abuse component in the plurality of abuse components and from the second subset of accounts, a corresponding account set predicted to have been used to conduct the corresponding type of abuse transactions based on the corresponding abuse score threshold, each account in the corresponding account set satisfying the corresponding abuse score threshold associated with the corresponding abuse component;

determining, by the one or more hardware processors, a first restriction rate representing a first ratio between a number of accounts from the first subset of accounts that are labeled as abusive and a first total number of accounts in the first subset of accounts;

determining, by the one or more hardware processors, a plurality of account restriction rates for the plurality of abuse components, wherein each account restriction rate in the plurality of account restriction rates determined for an abuse component represents a corresponding ratio between a number of accounts from the corresponding account set corresponding to the abuse component that are labeled as abusive and a corresponding total number of accounts in the corresponding account set corresponding to the abuse component;

calculating, by the one or more hardware processors, a restriction rate threshold based on the first restriction rate and the plurality of account restriction rates;

determining, by the one or more hardware processors, that a difference between the restriction rate threshold and a first account restriction rate determined for a first abuse component of the plurality of abuse components is greater than a threshold amount;

determining, by the one or more hardware processors, whether the first account restriction rate is less than the restriction rate threshold; and adjusting, by the one or more hardware processors, the first abuse score threshold for the first abuse component based on the difference.

11. The method of claim 10, further comprising:
evaluating a first account set corresponding to a first abuse component of the plurality of abuse component; and
labeling at least a portion of the first account set as abusive based on the evaluating.

12. The method of claim 10, further comprising normalizing the first abuse score threshold subsequent to the adjusting.

13. The method of claim 10, wherein the restriction rate threshold is an average restriction rate based on the first restriction rate and the plurality of account restriction rates.

14. The method of claim 10, further comprising:
determining a second difference between the restriction rate threshold and a second account restriction rate determined for a second abuse component from the plurality of abuse components; and
determining not to adjust a second abuse score threshold for the second abuse component when the second difference is less than the threshold amount.

15. The method of claim 14, further comprising:
determining that the first account restriction rate for the first abuse component is less than the restriction rate threshold, wherein the adjusting the first abuse score threshold comprises in response to determining that the first account restriction rate is less than the restriction rate threshold, increasing the first abuse score threshold associated with the first abuse component.

16. A non-transitory machine-readable medium having stored thereon machine-readable instructions executable to cause a machine to perform operations comprising:
processing a plurality of accounts using an abuse model, wherein the processing generates, for each account in the plurality of accounts, a risk score using the abuse model based on attributes of the account;
determining, from the plurality of accounts, that a first subset of accounts corresponds to a first risk category based on the first subset of accounts having first risk scores that satisfy a risk threshold corresponding to the abuse model;
determining, from the plurality of accounts, that a second subset of accounts corresponds to a second risk category based on the second subset of accounts having second risk scores that do not satisfy the risk threshold corresponding to the abuse model;
processing each account in the second subset of accounts using each one of a plurality of abuse components, wherein each abuse component in the plurality of abuse components is configured to predict whether an account has been used to conduct a corresponding type of abuse transactions based on a corresponding abuse score threshold;
determining, for each abuse component in the plurality of abuse components and from the second subset of accounts, a corresponding account set predicted to have been used to conduct the corresponding type of abuse transactions based on the corresponding abuse score threshold, each account in the corresponding account set satisfying the corresponding abuse score threshold associated with the corresponding abuse component;
determining a first restriction rate representing a first ratio between a number of accounts from the first subset of accounts that are labeled as abusive and a first total number of accounts in the first subset of accounts;
determining a plurality of account restriction rates for the plurality of abuse components, wherein each account restriction rate in the plurality of account restriction rates determined for an abuse component represents a corresponding ratio between a number of accounts from the corresponding account set corresponding to the abuse component that are labeled as abusive and a corresponding total number of accounts in the corresponding account set corresponding to the abuse component;

calculating a restriction rate threshold based on the first restriction rate and the plurality of account restriction rates;

determining that a difference between the restriction rate threshold and a first account restriction rate determined for a first abuse component of the plurality of abuse components is greater than a threshold amount;

determining whether the first account restriction rate is less than the restriction rate threshold; and adjusting a first abuse score threshold for the first abuse component based on the difference.

17. The non-transitory machine-readable medium of claim 16, wherein the operations further comprise:

evaluating a first account set corresponding to a first abuse component of the plurality of abuse component; and labeling at least a portion of the first account set as abusive based on the evaluating.

18. The non-transitory machine-readable medium of claim 16, wherein the restriction rate threshold is an average restriction rate based on the first restriction rate and the plurality of account restriction rates.

19. The non-transitory machine-readable medium of claim 18, wherein the operations further comprise:

determining that the first account restriction rate for a first abuse component is less than the restriction rate threshold, wherein the adjusting the first abuse score threshold comprises increasing the first abuse score threshold associated with the first abuse component.

20. The non-transitory machine-readable medium of claim 16, wherein the operations further comprise:

determining that the first account restriction rate for the first abuse component is greater than the restriction rate threshold, wherein the adjusting the first abuse score threshold comprises decreasing the first abuse score threshold associated with the first abuse component.

* * * * *